United States Patent [19]
Yang et al.

[11] Patent Number: 5,483,509
[45] Date of Patent: Jan. 9, 1996

[54] OPTICAL PICK-UP DEVICE WITH ERROR DETECTION USING P-WAVE

[75] Inventors: Keun Y. Yang; Eun J. Kim, both of Seoul, Rep. of Korea

[73] Assignee: Goldstar Co., Ltd., Seoul, Rep. of Korea

[21] Appl. No.: 274,527

[22] Filed: Jul. 13, 1994

[30] Foreign Application Priority Data

Jul. 15, 1993 [KR] Rep. of Korea .................. 1993-13329

[51] Int. Cl.$^6$ ............................................. G11B 7/095
[52] U.S. Cl. .................... 369/44.23; 369/44.41; 369/110; 369/112
[58] Field of Search .................. 369/13, 44.12, 369/44.23, 44.24, 44.37, 44.41, 44.42, 110, 112

[56] References Cited

U.S. PATENT DOCUMENTS

| | | | |
|---|---|---|---|
| 5,189,655 | 2/1993 | Ogata et al. | 369/44.23 |
| 5,258,967 | 11/1993 | Strasser et al. | 369/44.23 |
| 5,270,996 | 12/1993 | Ono | 369/44.23 X |
| 5,283,772 | 2/1994 | Miyake et al. | 369/44.23 |

Primary Examiner—W. R. Young
Attorney, Agent, or Firm—Spencer, Frank & Schneider

[57] ABSTRACT

An optical pick-up device capable of accurately detecting focus errors, tracking errors, magneto-optic signals and pit signals recorded on an optical disc by use of a dichotomous hologram and decreasing the number of optical elements used, thereby achieving a lightness and an improvement in reading rate. The optical pick-up device includes a laser transmission and receipt error detecting unit for detecting an error present at the optical disc, based on size of reproduced beams corresponding to a part of P-wave components of beams reflected depending on optical information recorded on the optical disc, a polarized-beam splitting unit for reflecting all of beams emerging from the collimator lens while being S-polarized and a part of beams emerging from the collimator lens while being P-polarized, and transmitting the remaining part of the P-polarized beams to focus them onto the optical disc via information record/reproduction processing unit, the polarized-beam splitting unit also serving to transmit and reflect beams reflected by the optical disc, and an optical information reading unit for reading the information recorded on the optical disc, based on signals respectively indicative of the sum of and the difference between all the S-wave components and the part of P-wave components of the beams received from the polarized-beam splitting unit.

13 Claims, 6 Drawing Sheets

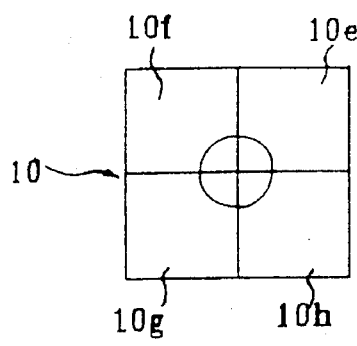 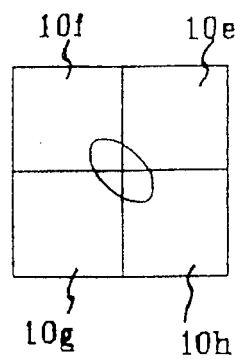 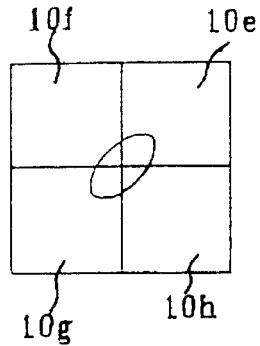
FIG. 3A  FIG. 3B  FIG. 3C
FIG. 4
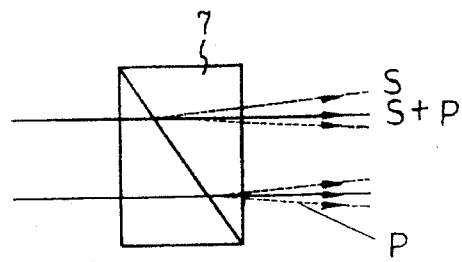
FIG. 5
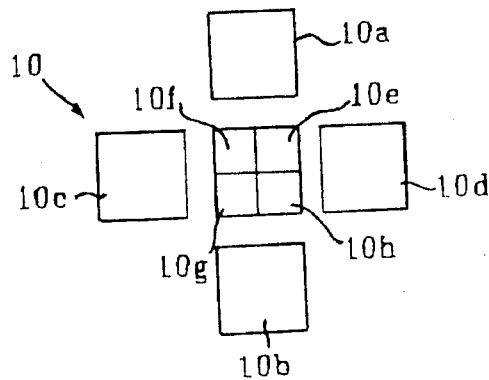

FIG. 6
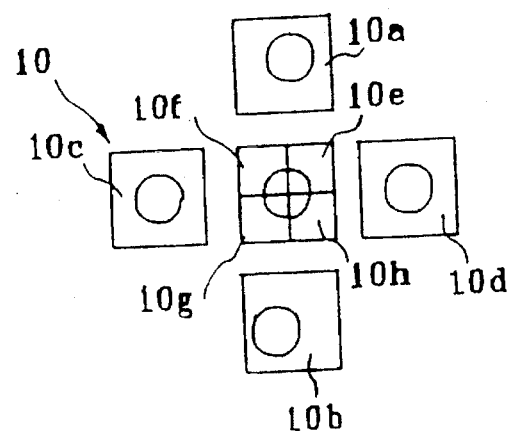
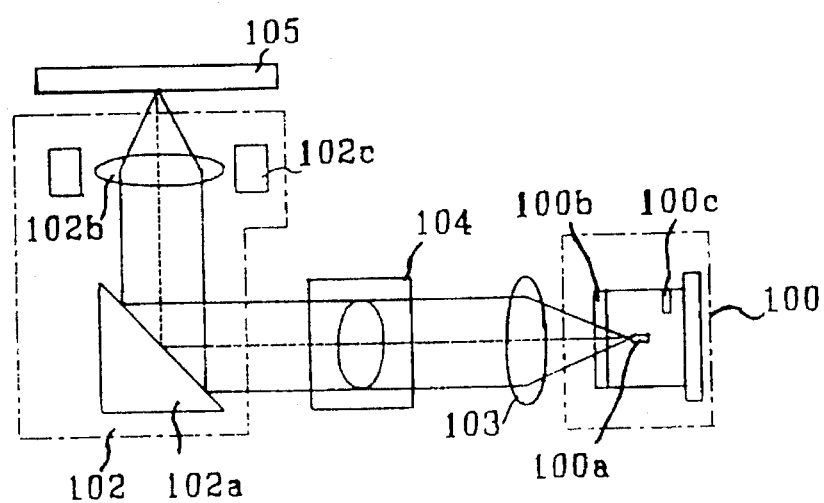
FIG. 7A

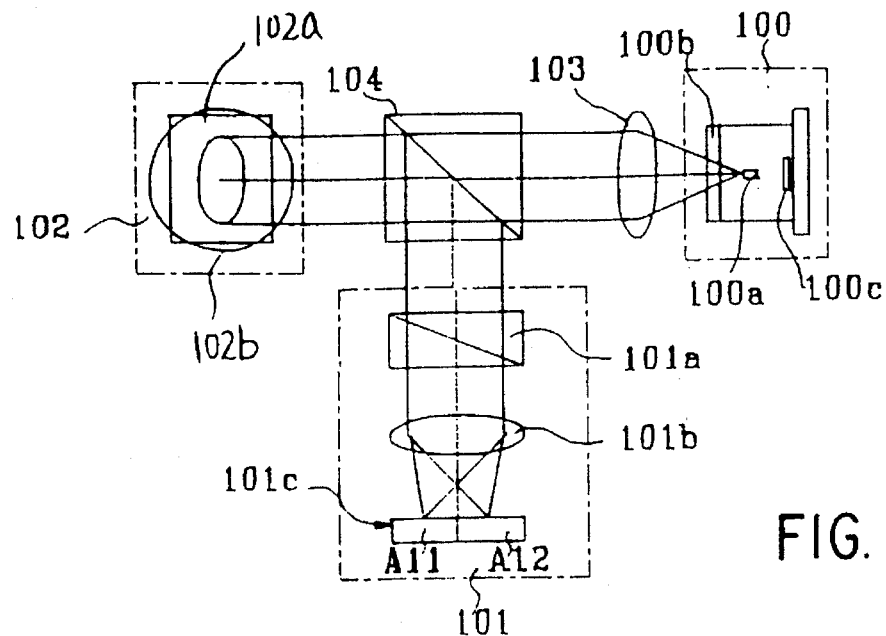
FIG. 7B
FIG. 8
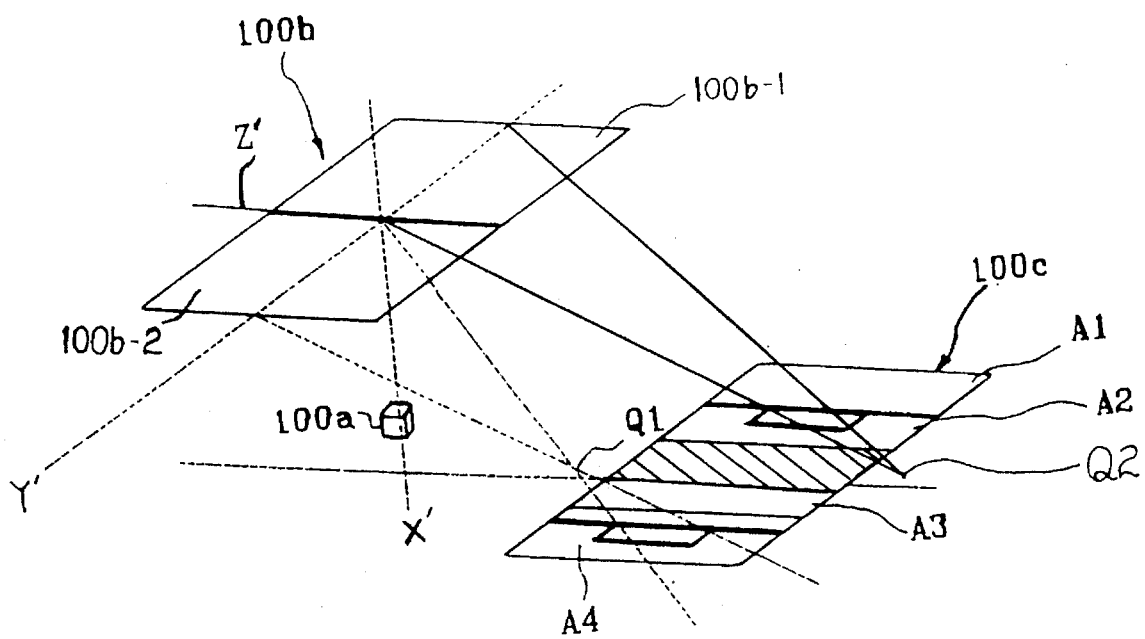

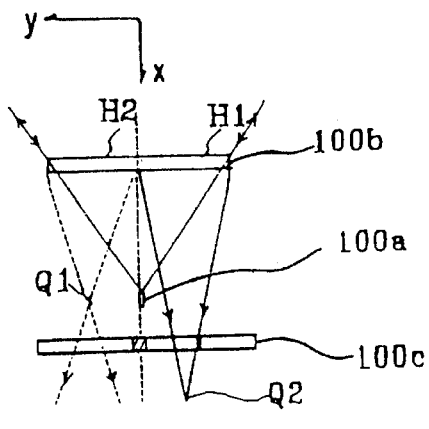
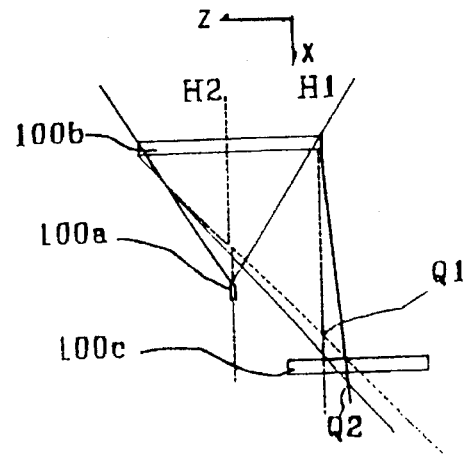
FIG. 9A        FIG. 9B
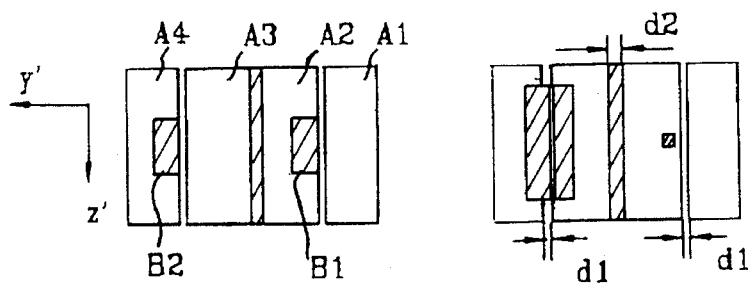
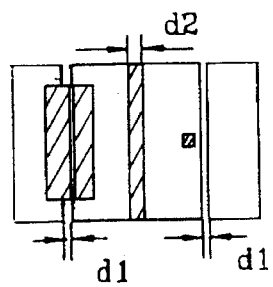
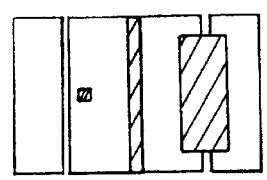
FIG. 10A     FIG. 10B     FIG. 10C Tp (Transmission Rate of P-wave)

OPTICAL PICK-UP DEVICE WITH ERROR DETECTION USING P-WAVE

BACKGROUND OF THE INVENTION

1. Field of the Invention

The present invention relates to an optical pick-up device for recording information on a magneto-optic disc and reading the information recorded, and more particularly to an optical pick-up device capable of not only accurately detecting focus errors and tracking errors, but also accurately detecting magneto-optic signals and pit signals recorded on an optical disc by use of a dichotomous hologram without using any diffraction lattice.

2. Description of the Prior Art

Referring to FIG. 1, there is illustrated a conventional optical pick-up device. As shown in FIG. 1, the optical pick-up device includes a laser unit 1 for emitting a laser beam, a diffraction lattice 2 for diffracting the laser beam emitted from the laser unit 1, thereby generating main beams and sub-beams for error detection, and a collimator lens 3 for converting the beams emerging from the diffraction lattice 2 into parallel beams. A polarized-beam splitter 4 is disposed downstream of the collimator lens 3. The polarized-beam splitter 4 serves to reflect all of S-polarized beams emerging from the collimator lens 3 and a part of P-polarized beams, namely, beams polarized in perpendicular to the S-polarized beams. The polarized-beam splitter 4 also transmits the remaining part of the P-polarized beams therethrough. The optical pick-up device further includes a reflection mirror 5 for perpendicularly reflecting the beams linearly polarized in the form of P-type wave by the polarized-beam splitter 4, and an object lens 6 for focusing the parallel beams of P-type wave reflected by the reflection mirror 5 onto an optical disc 11. A modified wollaston prism (MWP) 7 is also provided. The MWP 7 serves to convert the beam reflected by the optical disc 11 into a parallel beam through the object lens 6 depending on the presence of information recorded on the optical disc 11. The MWP 7 also separates the beam including three kinds of beams, namely, all of S-wave, a part of P-wave and a mixed beam of S-wave and P-wave, into five kinds of beams at different angles through the reflection mirror 5 and the polarized-beam splitter 4. The optical pick-up device further includes an imaging lens 8 for receiving the five kinds of beams separated by the MWP 7 and generating an image from the received beams, a concave lens 9 having a toric surface adapted to increase the divergence angle of the beams emerging from the focusing lens 8 and generate an astigmatism of the main beams (P-wave+S-wave) for detection of focus error, and a photo detector 10 for receiving the beams emerging from the concave lens 9 and detecting focus error, tracking error and optical information from the received beams.

In the conventional optical pick-up device having the above-mentioned arrangement, P-wave and S-wave have a certain relation.

Assuming that an X-axis extends in a direction perpendicular to the travel direction of a laser beam, the P-wave corresponds to a beam polarized in a direction perpendicular to both the X-axis and the travel direction of the laser beam. On the other hand, the S-wave corresponds to a beam parallel to the X-axis. Typically, the laser beam emitted from the laser unit 1 is at a polarized state.

The laser beam emitted from the laser unit 1 is subjected to a diffraction by the diffraction lattice 2, thereby generating three kinds of beams, namely, main beams and two kinds of sub-beams. The three kinds of diffracted beams enter the collimator lens 3 and then converted into parallel beams which are, in turn, incident on the polarized-beam splitter 4.

The polarized-beam splitter 4 reflects totally the S-wave components of the main beams emerging from the collimator lens 3 in the form of parallel beams at the boundary surface 4a thereof while transmitting the P-wave components of the main beams and the sub-beams therethrough. The P-waves and the sub-beams transmitted through the polarized-beam splitter 4 are fed to the reflection mirror 5 and then perpendicularly reflected by the reflection mirror 5.

The P-polarized beams and the sub-beams emerging from the reflection mirror 5 are concentrated by the objection lens 6 so that they are focused onto a track T1 of the optical disc 11.

The main beams M1 focused onto the optical disc 11 are used for reading of information and detection of focus error whereas the two kinds of sub-beams SB1 and SB2 are used for detection of tracking error.

The main beam M1 of P-wave and two kinds of sub-beams SB1 and SB2 are then reflected from the optical disc 11 while carrying information (pit information or information elliptically polarized by magnetization) recorded on the optical disc 11. Thereafter, these beams are incident on the object lens 6 which, in turn, converts the received beams into parallel beams again. The parallel beams are fed to the reflection mirror 5 and then reflected by the reflection mirror 5. The beams from the reflection mirror 5 enter the polarized-beam splitter 4. Where the optical disc 11 has information recorded thereon, an elliptical polarization occurs, thereby generating beams of S-wave.

The beams of S.-wave are mixed with the beams of P-wave to compose the main beams M1. Together with the two kinds of sub-beams SB1 and SB2, the beams of S-wave are incident on the polarized-beam splitter 4. Where the optical disc 11 has no information recorded thereon, however, only the beams of P-wave and the two kinds of sub-beams enter the polarized-beam splitter 4.

The following description will be made in conjunction with the case wherein the optical disc 11 has information recorded thereon.

All the S-wave components of the main beams M1, a part of the P-wave components of the main beams M1 and two kinds of sub-beams SB1 and SB2 incident on the polarized-beam splitter 4 are reflected at the boundary surface 4a of the polarized-beam splitter 4 and then fed to the MWP 7.

The two kinds of sub-beams SB1 and SB2 incident on the MWP 7 pass directly through the MWP 7 to be incident on the imaging lens 8. On the other hand, the main beams M1 are splitted into three kinds of beams while passing through the MWP 7.

In other words, the main beams M1 are splitted into beams of S-wave, beams of P-wave and beams of a mixture of P-wave and S-wave. Accordingly, 5 kinds of beams totally including the three kinds of beams and the two kinds of sub-beams are incident on the imaging lens 8 to generate an image.

The five kinds of beams emerging from the imaging lens 8 are then fed to the concave lens 9 having the toric surface, thereby increasing the divergence angle thereof. By the concave lens 9, an astigmatism occurs at the main beams for the detection of focus error. The five kinds of beams emerging from the concave lens 9 are then focused onto the photo detector 10 which has octant regions, as shown in FIG. 6.

The octant photo detector 10 detects a tracking error from a signal difference between the two kinds of sub-beams respectively focused onto the first and second regions 10a and 10b by the concave lens 9.

In other words, assuming that Sa and Sb are the signal indicative of the sub-beams focused onto the first region 10*a* and the signal indicative of the sub-beams focused onto the second region 10*b*, respectively, the tracking error signal TES can be derived from the following equation (1):

$$TES = Sa - Sb \qquad (1)$$

On the other hand, the focus error can be detected from the signal difference of the main beams focused onto the fifth to eighth regions 10*f* to 10*h* of the photo detector 10 caused due to the astigmatism as the distance between the optical disc 11 and the object lens 6 varies.

In other words, assuming that Se, Sf, Sg and Sh are the signal indicative of the main beams focused onto the fifth region 10*e*, the signal indicative of the main beams focused onto the sixth region 10*f*, the signal indicative of the main beams focused onto the seventh region 10*g*, and the signal indicative of the main beams focused onto the eighth region 10*h*, respectively, the focus error signal FES can be derived from the following equation (2):

$$FES = (Sf + Sg) - (Se + Sh) \qquad (2)$$

Where no focus error occurs, the main beams are focused onto the fifth to eighth regions 10*e* to 10*h* of the photo detector 10 in the form of a circular polarized beam, as shown in FIG. 3A. Where a focus error occurs, the main beams are focused in the form of an elliptical polarized beams, as shown in FIGS. 3B and 3C.

According, where neither of the tracking error and the focus error, both the tracking error signal TES and the focus error signal FES become zero (TES=0, FES=0).

Where the information recorded on the optical disc 11 is a magneto-optic signal (Kerr rotation based on magnetization), it is detected from the signal difference between the P-wave or S-wave focused onto the third region 10*c* and the P-wave or S-wave focused onto the fourth region 10*d*.

In other words, assuming that Sc and Sd are the signal indicative of the beams of S-wave focused onto the third region 10*c* and the signal indicative of the beams of P-wave focused onto the fourth region 10*d* (of course, the P-wave and S-wave may be incident on the third and fourth regions, respectively), the optical information signal can be derived from the following equation (3):

$$\text{Optical information signal (magneto-optic signal)} = Sc - Sd \qquad (3)$$

Where the information recorded on the optical disc 11 is a saw-shaped pit signal, the optical information signal can be derived from the following equation (4):

$$\text{Optical information signal (pit signal)} = Sc + Sd \qquad (4)$$

However, the conventional optical pick-up device for magneto-optic discs should use the diffraction lattice for detecting tracking error in accordance with the three-beam process. The optical pick-up device should also use the concave lens with the toric surface involving a difficulty in manufacture and an expensive cost and the modified wollaston prism involving a difficulty in manufacture for detecting focus error in accordance with the astigmatism process and reading information recorded on a magneto-optic disc. Furthermore, the conventional optical pick-up device should employ an optical system requiring an increased number of constituting elements. As a result, the pick-up device is increased in its weight, thereby resulting in a degradation in reading rate and an increase in manufacture cost.

SUMMARY OF THE INVENTION

Therefore, an object of the invention is to provide an optical pick-up device capable of not only accurately detecting focus errors and tracking errors, but also accurately detecting magneto-optic signals and pit signals recorded on an optical disc by use of a dichotomous hologram in place of a diffraction lattice, a concave lens and a modified wollaston prism.

Another object of the invention is to provide an optical pick-up device capable of decreasing the number of optical elements used, thereby achieving a lightness and an improvement in reading rate.

In accordance with the present invention, this object can be accomplished by providing an optical pick-up device comprises: laser transmission and receipt error detecting means for emitting a laser beam to be transmitted to an optical disc and detecting an error present at the optical disc, based on size of reproduced beams corresponding to a part of P-wave components of beams reflected depending on optical information recorded on the optical disc and focused onto the laser transmission and receipt error detecting means by a diffraction; a collimator lens for converting the laser beam emitted from the laser transmission and receipt error detecting means into parallel beams; polarized-beam splitting means for reflecting all of the beams emerging from the collimator lens while being S-polarized and a part of the beams emerging from the collimator lens while being P-polarized in perpendicular to the S-polarized beams, and transmitting the remaining part of the P-polarized beams to focus them onto the optical disc via information record/reproduction processing means including a reflection mirror and an object lens, the polarized-beam splitting means further serving to transmit and reflect beams reflected by the optical disc and then fed via the object lens and the reflection mirror; and optical information reading means for reading the information recorded on the optical disc, based on signals respectively indicative of the sum of and the difference between all the S-wave components and the part of P-wave components of the beams received from the polarized-beam splitting means.

BRIEF DESCRIPTION OF THE DRAWINGS

Other objects and aspects of the invention will become apparent from the following description of embodiments with reference to the accompanying drawings in which:

FIGS. 3A to 3C are schematic views respectively illustrating a state of beams focused onto a photo detector and varied depending on the space between the optical disc and an object leans in the optical pick-up device of FIG. 1, wherein FIG. 3A shows the state of focused beams where there is no focus error, FIG. 3B shows the state of focused beams where the space between the object lens and the optical disc is decreased, thereby generating a focus error, and FIG. 3C shows the state of focused beams where the space between the object lens and the optical disc is increased, thereby generating a tracking error;

FIG. 4 is a schematic view explaining separation of S-wave and P-wave by a modified wollaston prism employed in the optical pick-up device of FIG. 1;

FIG. 5 is a schematic view illustrating an octant photo detector employed in the optical pick-up device of FIG. 1;

FIG. 6 is a schematic view illustrating focusing of five kinds of beams carried out in the photo detector of FIG. 5;

FIGS. 7A and 7B illustrate respectively an optical pick-up device in accordance with the present invention, wherein FIG. 7A is a front view, and FIG. 7B is a plan view;

FIG. 8 is a schematic view illustrating modules of a hologram and a second photo detector both constituting a laser transmission and receipt error detecting unit of the optical pick-up device of FIGS. 7A and 7B;

FIGS. 9A and 9B illustrate respectively a state of beams diffracted by the hologram of FIG. 8, wherein FIG. 9A is a schematic view taken in the Z'-direction of FIG. 8, and FIG. 9B is a schematic view taken in the Y'-direction of FIG. 8;

FIGS. 10A to 10C are schematic views respectively illustrating a state of laser beams at the second photo detector varied depending on the space between an object lens of FIG. 7 and the optical disc;

DETAILED DESCRIPTION OF THE PREFERRED EMBODIMENTS

Figure 1:
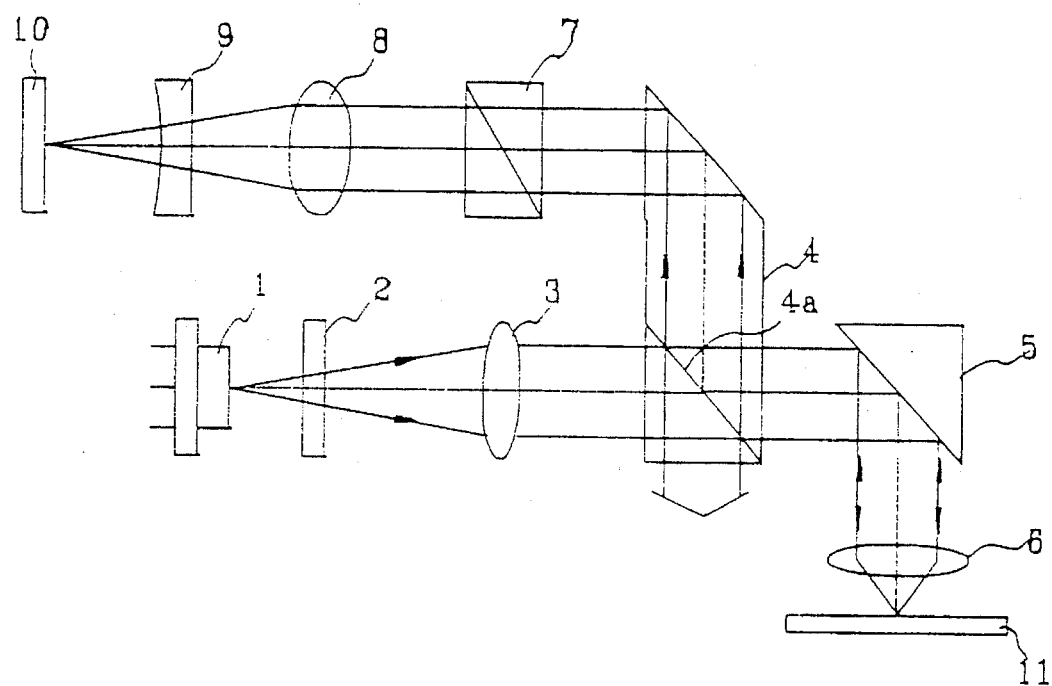
FIG. 1 is a schematic view illustrating a conventional optical pick-up device.
Figure 2:
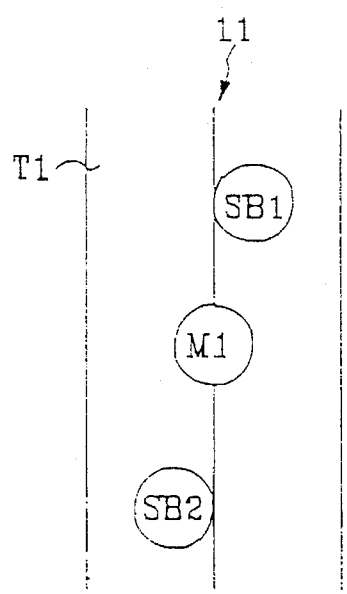
FIG. 2 is a schematic view explaining states of beams focused onto a track of an optical disc in accordance with the optical pick-up device of FIG. 1.

Referring to FIGS. 7A and 7B, there is illustrated an optical pick-up device in accordance with the present invention. As shown in FIGS. 7A and 7B, the optical pick-up device includes a laser transmission and receipt error detecting unit 100 for emitting a laser beam to be transmitted to an optical disc 105 and detecting an error present at the optical disc 105, based on size of reproduced beams corresponding to a part of P-wave components of beams reflected depending on optical information recorded on the optical disc 105 and focused onto regions of the laser transmission and receipt error detecting unit 100 by a diffraction, and a collimator lens 103 for converting the laser beam emitted from the laser transmission and receipt error detecting unit 100 into parallel beams. A polarized-beam splitting unit 104 is disposed downstream of the collimator lens 103. The polarized-beam splitting unit 104 serves to reflect all of the beams emerging from the collimator lens 103 while being S-polarized and a part of the beams emerging from the collimator lens while being P-polarized, namely, polarized in perpendicular to the S-polarized beams. The polarized-beam splitting unit 104 also serves to transmit the remaining part of the P-polarized beams. The optical pick-up device further includes an information record/reproduction processing unit 102 for focusing the P-polarized beams transmitted through the polarized-beam splitting unit 104 onto the optical disc 105 via a reflection mirror 102a and an object lens 102b and reversely processing the beams reflected from the optical disc 105 to feed the beams to the polarized-beam splitting unit 104, an optical information reading unit 101 for reading the information recorded on the optical disc 105, based on signals respectively indicative of the sum of and the difference between all the S-wave components and the part of P-wave components of the beams received from the polarized-beam splitting unit 104, and an actuator 102c for shifting vertically and laterally the object lens 102b depending on a tracking error and a focus error detected by the laser transmission and receipt error detecting unit 100. The actuator 102c constitutes a part of the information record/reproduction processing unit 102.

The laser transmission and receipt error detecting unit 100 includes a laser 100a adapted to emit a laser beam to be transmitted to the optical disc 105, a hologram 100b adapted to transmit the laser beam emitted from the laser 100a to the collimator lens 103, receive beams of P-wave reflected from the optical disc 105 through the collimator lens 103 and diffract the received beams of P-wave at a predetermined angle so as to focus the beams of P-wave, and a second photo detector 100c divided into four regions A1 to A4 and adapted to detect focus error and tracking error, based on the size of the reproduced beams corresponding to a part of the beams of P-wave and focused onto the regions A1 to A4 by the diffraction through the hologram 100b.

As shown in FIG. 7B, the optical information reading unit 101 includes a wollaston prism 101a adapted to separate all the beams of S-wave and a part of beams of P-wave from the optical disc 105 reflected by the polarized-beam splitting unit 104, at a predetermined angle, a focusing lens 101b adapted to focus all the beams of S-wave and the part of the beams of P-wave separated by the wollaston prism 101a, and a first photo detector 101c divided into two regions A11 and A12 and adapted to detect an optical information signal and a pit signal from the signal difference between the beams of S-wave and P-wave incident on the regions A11 and A12 via the focusing lens 101b and the signal sum of the same beams of S-wave and P-wave.

The hologram 100b is constructed to make the laser 100a has an active layer extending in parallel to an X-Y plane so that the beam emitted from the laser 100a is polarized in the form of P-wave as it is incident on the polarized-beam splitting unit 104.

As shown in FIGS. 8 and 9, the hologram 100b includes a first hologram member 100b-1 and a second hologram member 100b-2. The hologram members 100b-1 and 100b-2 are constructed to have a focus position of reference light (laser beam) corresponding to the laser beam-emitting point of the laser 100a. The focus position of object light of the first hologram member 100b-1 corresponds to a focus position Q2 disposed downstream of the second photo detector 100c divided into four regions. On the other hand, the focus position of object light of the second hologram member 100b-2 corresponds to a position Q1 disposed upstream of the second photo detector 100c. When the beams fed toward the laser beam-emitting point of the laser 100a are incident on the first hologram member 100b-1, they are focused at the position Q2 disposed downstream of the second region A2 of the second photo detector 100c. On the other hand, the beams incident on the second hologram 100b-2 are focused at the position Q1 disposed upstream of the fourth region A4 of the second photo detector 100c, namely, disposed between the hologram 100b and the second photo detector 100c.

Assuming that the laser beams focused by the first and second hologram members 100b-1 and 100b-2 are cut off by the second photo detector 100c when they pass through the second photo detector 100c, the laser beams cut off by the first hologram member 100b-1 are disposed at the second region A2 of the second photo detector 100c such that they are contiguous to the boundary between the first and second regions A1 and A2 of the second photo detector 100c, as shown in FIG. 10A. On the other hand, the laser beams cut off by the second hologram member 100b-2 are disposed at the fourth region A4 of the second photo detector 100c such that they are contiguous to the boundary between the third and fourth regions A3 and A4 of the second photo detector 100c.

As shown in FIGS. 10A to 10C, the second photo detector 100c has quadrant regions A1 to A4 laterally arranged and having a predetermined size. The gap d2 defined between the second and third regions A2 and A3 is larger than the gap d1 defined between the first and second regions A1 and A2 or between the third and fourth regions A3 and A4.

Operation of the optical pick-up device having the above-mentioned arrangement in accordance with the present invention will now be described, in conjunction with FIGS. 7A to 13.

As a laser beam is emitted from the laser 100a of the laser transmission and receipt error detecting unit 100, it is fed to the hologram 100b, so that it is diffracted into zero-ordered main beams (P-wave+S-wave) and two kinds of sub-beams including a plus-ordered kind and a minus-ordered kind, through the first hologram member 100b-1 and the second hologram member 100b-2. In this case, only the zero-ordered main beams are converted into parallel beams by the collimator lens 103 and then fed to the polarized-beam splitting unit 104.

The main beams (P-wave+S-wave) converted into the parallel beams through the collimator lens 103 are partially reflected at the boundary surface of the polarized-beam splitting unit 104. In other words, all the beams of S-wave and a part, namely, 33% of the beams of P-wave are reflected. Only 67% of the linearly polarized P-wave beams is transmitted through the polarized-beam splitting unit 104 and then perpendicularly reflected by the reflection mirror 102a of the information record/reproduction processing unit 102.

The 67% P-polarized beam reflected from the reflection mirror 102a is then focused onto the optical disc 105 by the object lens 102b.

Thereafter, the main beams of P-wave focused onto the optical disc 105 are reflected from the optical disc 105 while carrying information (pit information or information elliptically polarized by magnetization) recorded on the optical disc 105 and information required for detection of tracking error. The reflected beams are then converted into parallel beams by the object lens 102b again. The parallel beams are subsequently incident on the reflection mirror 102a which, in turn, reflects the received beam to the polarized-beam splitting unit 104. The beam incident on the polarized-beam splitting unit 104 is varied in beam components depending on the fact of whether the beam carries information or not. Where there is information recorded on the optical disc 105, the beams of S-wave generated by the elliptical polarization enter the polarized-beam splitting unit 104 as the main beams while being mixed with the beams of P-wave. On the other hand, where there is no information recorded onto the optical disc 105, only the beams of P-wave enter the polarized-beam splitting unit 104.

Since the parallel beams incident on the polarized-beam splitting unit 104 include the S-wave components at the information-recorded state of the optical disc 105, the S-wave components are 100% reflected from the boundary surface of the polarized-beam splitting unit 104 and then incident on the wollaston prism 101a. On the other hand, 67% of the beams of P-wave passes through the boundary surface of the polarized-beam splitting unit 104 and then enters the collimator lens 103 while the remaining part, namely, 33% of the beams of P-wave is reflected from the boundary surface of the polarized-beam splitting unit 104 and then incident on the wollaston prism 101a of the optical information reading unit 101 as the main beams while being mixed with 100% of the beams of S-wave.

Figure 11:
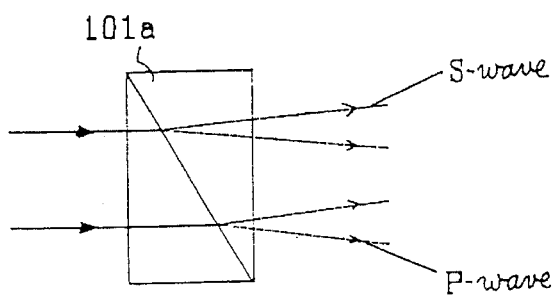
FIG. 11 is a schematic view explaining separation of S-wave and P-wave by a wollaston prism employed in the optical pick-up device of FIG. 7.
Figure 12:
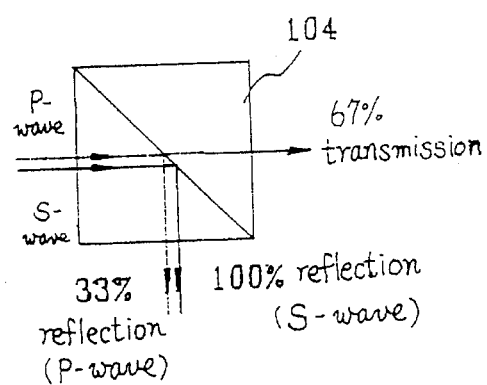
FIG. 12 is a schematic view explaining reflection and transmission of S-wave and P-wave by a polarized-beam splitting unit employed in the optical pick-up device of FIG. 7.
Figure 13:
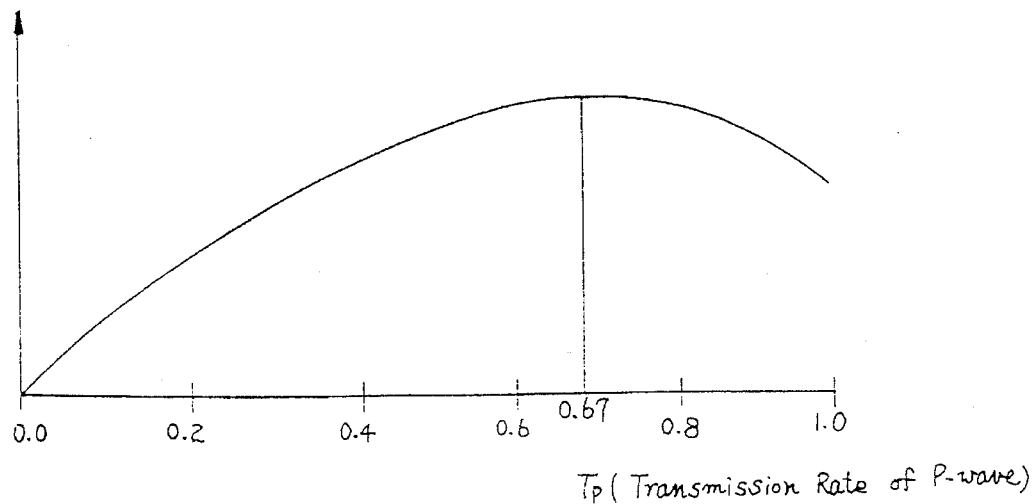
FIG. 13 is a graph illustrating a variation in transmission rate of P-wave depending on the pick-up efficiency in accordance with the present invention.

The main beams incident on the wollaston prism 101a and composed by the mixed beams of P-wave and S-wave are linearly polarized at the boundary surface of the wollaston prism 101a, so that the beams of S-wave and P-wave are separated at a predetermined angle, as shown in FIG. 11.

The beams of S-wave and P-wave separated at the predetermined angle by the wollaston prism 101a are then focused onto the first photo detector 101c divided into two regions, via the focusing lens 101b of the optical information reading unit 101.

The first photo detector 101c reads the information recorded on the optical disc 105 from the signal difference between the beams of S-wave and the P-wave respectively focused onto the first and second regions A11 and A12 thereof. Where the information recorded on the optical disc 105 is a magneto-optic signal (beam elliptically polarized by magnetization), it is detected from the signal difference between the P-wave or S-wave focused onto the first region A11 and the S-wave or P-wave focused onto the second region A12.

In other words, assuming that S11 and S12 are the signal indicative of the beams of S-wave focused onto the first region A11 and the signal indicative of the beams of P-wave focused onto the second region A12 (of course, the P-wave and S-wave may be incident on the first and second regions, respectively), the optical information signal can be derived from the following equation (5):

Optical information signal (magneto-optic signal)=S11−S12   (5)

Where the information recorded on the optical disc 105 is a saw-shaped pit signal, the optical information signal can be derived from the sum of the electrical signals of S-wave and P-wave respectively focused onto the first and second regions by use of the following equation (6):

Optical information signal (pit signal)=S11+S12   (6)

The 67% of the P-wave passing through the polarized-beam splitting unit 104 is used for detection of focus error and tracking error. This will now be descried in detail.

The beams of 67% P-wave transmitted through the polarized-beam splitting unit 104 are focused onto the laser beam-emitting surface by the collimator lens 103. Thereafter, the focused beams are incident on both the first and second hologram members 100b-1 and 100b-2 disposed between the laser 100a and the object lens 102b. The incident beams of P-wave serves as reference light for the first and second holograms 100b-1 and 100b-2. As the incident beams are diffracted and focused at focus positions Q1 and Q2 of object light, thereby reproducing the object light. The reproduced light beams are detected by the second photo detector 100c which, in turn, generates signals respectively required for detection focus error and tracking error.

In other words, the beams of 67% P-wave transmitted through the polarized-beam splitting unit 104 and the collimator lens 103 are focused onto both the first and second hologram members 100b-1 and 100b-2, as shown in FIG. 8 and FIGS. 9A and 9B. FIG. 9A shows the diffracted state of the beams when viewed in the Z'-direction of FIG. 8 whereas FIG. 9B the diffracted state of the beams when viewed in the Y'-direction of FIG. 8.

The beams focused onto the hologram 100b are partially diffracted and focused at the position Q2 disposed downstream of the second region A2 of the second photo detector 100c having quadrant regions, by the first hologram member 100b-1. The remaining part of the beam focused onto the hologram 100b is diffracted and focused at the position Q1 disposed upstream of the fourth region A4 of the second photo detector 100c by the second hologram member 100b-2.

The laser beams, which are denoted by the reference character B1, focused by the first hologram member 100b-1 are disposed at the second region A2 such that they are contiguous to the boundary between the first and second regions A1 and A2 of the second photo detector 100c. On the other hand, the laser beams, which are denoted by the reference character B2, focused by the second hologram member 100b-2 are disposed at the fourth region A4 such that they are contiguous to the boundary between the third and fourth regions A3 and A4 of the second photo detector 100c.

Accordingly, where the optical disc 105 and the object lens 102b are accurately spaced from each other, the signal detected at the second region A2 and the signal detected at the fourth region A4 are identical to each other, as shown in FIG. 10A.

Where the space between the optical disc 105 and the object lens 102b is larger, the focus positions Q1 and Q2 of the beam diffracted and focused by the first and second hologram members 100b-1 and 100b-2 are shifted away from the hologram 100b. As a result, the beams B1 focused onto the second region A2 by the first hologram member 100b-1 are increased in size, so that they extend to the first region A1, as shown in FIG. 10C. On the other hand, the beams B2 focused onto the fourth region A4 by the second hologram 100b-2 are decreased in size, so that they do not affect the third region A3.

On the contrary, where the space between the optical disc 105 and the object lens 102b is smaller, the focus positions Q1 and Q2 of the beam diffracted and focused by the first and second hologram members 100b-1 and 100b-2 are shifted toward the hologram 100b. As a result, the beams B1 focused onto the second region A2 by the first hologram member 100b-1 are decreased in size, so that they do not affect the first region A1, as shown in FIG. 10B. On the other hand, the beams B2 focused onto the fourth region A4 by the second hologram 100b-2 are increased in size, so that they extend to the third region A3. Utilizing this principle, focus error can be detected.

In other words, assuming that S1, S2, S3 and S4 are electrical signals respectively indicative of the beams focused onto the first region A1, the beams focused onto the second region A2, the beam focused onto the third region A3 and the beams focused onto the fourth region A4, a focus error signal FES can be derived from the following equation (7):

$$FES=(S1+S4)-(S2+S3) \qquad (7)$$

Where no focus error occurs, the focus error signal becomes zero in level (FES=0). Where a focus error is generated when the optical disc 105 and the object lens 102b of the record/reproduction processing unit 102 are relatively shifted toward each other, the focus error signal becomes higher in level (FES>0). On the other hand, where a focus error is generated when the optical disc 105 and the object lens 102b are relatively shifted away from each other, the focus error signal becomes lower in level (FES<0). Accordingly, the focus error can be corrected by vertically shifting the object lens 102b using the actuator 102c.

Now, correction of a tracking error generated on the optical disc 105 will be described.

Since the boundary between the first and second hologram members 100b-1 and 100b-2 extends in a tangent direction of tracks of the optical disc 105, the beam focused onto the optical disc 105 is disposed inwardly, namely, toward the center of the optical disc 105. As a result, the inner, first hologram member 100b receives a larger amount of light than the outer, second hologram member 100b-2. Consequently, the intensity of beam to which the first and second regions A1 and A2 are subjected is higher than the intensity of beam to which the third and fourth regions A3 and A4 are subjected. Therefore, a tracking error signal TES can be derived from the following equation (8):

$$TES=(S1+S2)-(S3+S4) \qquad (7)$$

Where the focused beams are disposed inwardly of a track of the optical disc 105, the tracking error signal TES has a high level (TES>0). On the other hand, where the focused beams are disposed outwardly of the track of the optical disc 105, the tracking error signal TES has a low level (TES<0). Accordingly, the tracking error can be corrected by laterally shifting the object lens 102b using the actuator 102c of the information record/reproduction processing unit 102.

As apparent from the above description, the present invention provides an optical pick-up device capable of accurately detecting focus error and tracking error as well as magneto-optic signals and pit signals recorded on an optical disc in accordance with an one-beam process utilizing a push-pull control based on the size of beam by use of a dichotomous hologram in place of a diffraction lattice, a concave lens and a modified wollaston prism. In accordance with the present invention, it is possible to reduce the number of optical elements constituting the optical pick-up device and thereby achieve a lightness of the optical pick-up device itself and an improvement in reading rate.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An optical pick-up device comprises:

laser transmission and receipt error detecting means for emitting a laser beam to be transmitted to an optical disc and detecting an error present at the optical disc, based on size of reproduced beams corresponding to a part of P-wave components of beams reflected depending on optical information recorded on the optical disc and focused onto the laser transmission and receipt error detecting means by a diffraction;

a collimator lens for converting the laser beam emitted from the laser transmission and receipt error detecting means into parallel beams;

polarized-beam splitting means for reflecting all of the beams emerging from the collimator lens while being S-polarized and a part of the beams emerging from the collimator lens while being P-polarized in perpendicular to the S-polarized beams, and transmitting the remaining part of the P-polarized beams to focus them onto the optical disc via information record/reproduction processing means including a reflection mirror and an object lens, the polarized-beam splitting means further serving to transmit and reflect beams reflected by the optical disc and then fed via the object lens and the reflection mirror; and optical information reading means for reading the information recorded on the optical disc, based on signals respectively indicative of the sum of and the difference between all the S-wave components and the part of P-wave components of the beams received from the polarized-beam splitting means.

2. An optical pick-up device in accordance with claim 1, wherein the laser transmission and receipt error detecting means comprises:

a laser adapted to emit the laser beam to be transmitted to the optical disc;

a hologram adapted to transmit the laser beam emitted from the laser to the collimator lens, receive beams of P-wave reflected from the optical disc through the collimator lens and diffract the received beams of P-wave at a predetermined angle so as to focus the beams of P-wave; and a photo detector adapted to detect a focus error and a tracking error, based on the size of the reproduced beams corresponding to a part of the beams of P-wave and focused onto the photo detector by a diffraction through the hologram.

3. An optical pick-up device in accordance with claim 2, wherein the hologram comprises a pair of hologram members.

4. An optical pick-up device in accordance with claim 3, wherein the hologram members are constructed such that focus position of reference light determined by the hologram members corresponds to a laser beam-emitting point of the laser, that focus position of object light determined by the first one of the hologram members corresponds to a position disposed downstream of the photo detector of the laser transmission and receipt error detecting means, and that focus position of object light determined by the second one of the hologram members corresponds to a position disposed upstream of the photo detector of the laser transmission and receipt error detecting means.

5. An optical pick-up device in accordance with claim 3, wherein the first hologram member serves to focus laser beams at a position disposed downstream of a second one of four detection regions laterally arranged and provided at the photo detector, and the second hologram member serves to focus laser beams at a position disposed upstream of a fourth one of the detection regions.

6. An optical pick-up device in accordance with claim 3, wherein the first hologram member serves to focus laser beams onto a second one of four detection regions laterally arranged and provided at the photo detector such that the laser beams are contiguous to a boundary between first and second ones of the detection regions, and the second hologram member serves to focus laser beams onto a fourth one of the detection regions such that the laser beams are contiguous to a boundary between third and fourth ones of the detection regions.

7. An optical pick-up device in accordance with claim 2, wherein the photo detector has four detection regions laterally arranged and having a predetermined size.

8. An optical pick-up device in accordance with claim 7, wherein second and third ones of the detection regions define therebetween a gap larger than that defined between first and second ones of the detection regions and that defined between third and fourth ones of the detection regions.

9. An optical pick-up device in accordance with claim 2, wherein the photo detector performs the detection of tracking error, based on a signal indicative of a difference between the sum of signals generated from first and second ones of detection regions of the photo detector and the sum of signals generated from third and fourth ones of detection regions of the photo detector.

10. An optical pick-up device in accordance with claim 2, wherein the hologram is constructed to make the laser has an active layer extending in parallel to an X-Y plane so that the beam emitted from the laser is polarized in the form of P-wave as it is incident on the polarized-beam splitting means.

11. An optical pick-up device in accordance with claim 1, wherein the optical information reading means comprises:

a wollaston prism adapted to separate all of beams of S-wave and a part of beams of P-wave from the optical disc reflected by the polarized-beam splitting means at a predetermined angle;

a focusing lens adapted to focus all the beams of S-wave and the part of the beams of P-wave separated by the wollaston prism; and a photo detector adapted to detect an optical information signal and a pit signal, based on the signal difference between the beams of S-wave and P-wave incident on the photo detector via the focusing lens and the signal sum of the same beams of S-wave and P-wave.

12. An optical pick-up device in accordance with claim 11, wherein the photo detector has a pair of detection regions laterally arranged and having a predetermined size.

13. An optical pick-up device in accordance with claim 1, wherein the polarized-beam splitting means performs the transmission and reflection of the P-polarized beams at a transmission-to-reflection ratio ranged from 7:3 to 6:4.

* * * * *